United States Patent
Curtis (10) Patent No.: US 6,856,461 B2
(45) Date of Patent: Feb. 15, 2005

(54) TUNABLE OPTICAL FILTER (75) Inventor: Kevin Curtis, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 414 days.

(21) Appl. No.: 09/996,823

(22) Filed: Nov. 30, 2001

(65) Prior Publication Data

US 2002/0186928 A1 Dec. 12, 2002

Related U.S. Application Data (60) Provisional application No. 60/296,451, filed on Jun. 8, 2001.

(51) Int. Cl.⁷ .................................................. G02B 5/18
(52) U.S. Cl. ........................ 359/573; 359/569; 359/566; 385/37; 385/10; 385/8
(58) Field of Search ................................ 359/573, 569, 359/566, 15, 3; 385/37, 8, 10, 14, 16; 430/1, 2

(56) References Cited

U.S. PATENT DOCUMENTS

| | | |
|---|---|---|
| 4,106,848 A | 8/1978 | Conwell et al. |
| 5,185,829 A * | 2/1993 | Yamada et al. ............... 385/37 |
| 5,334,333 A | 8/1994 | Goetz |
| 5,566,982 A | 10/1996 | Lehureau et al. |
| 5,569,565 A | 10/1996 | Kawakami et al. |
| 5,613,022 A | 3/1997 | Odhner et al. |
| 5,640,256 A | 6/1997 | De Vre |
| 5,874,187 A | 2/1999 | Colvin et al. |
| 5,942,157 A | 8/1999 | Sutherland et al. |
| 5,989,923 A | 11/1999 | Lowe et al. |

FOREIGN PATENT DOCUMENTS

EP  0453362 A1 * 4/1991 ................... 385/37

* cited by examiner

Primary Examiner—Fayez G. Assaf
(74) Attorney, Agent, or Firm—Morrison & Foerster LLP

(57) ABSTRACT

A tunable optical device for adding or dropping one or more channels in a wavelength division multiplexing communication system is disclosed. The tunable optical device comprises one or more filters, wherein at least one filter comprises (a) one or more elastimers and (b) one or more gratings. An elastimer is a polymer that expands and contracts with a change in a voltage applied across the polymer or when a certain wavelength of light is diffracted from or transmitted through the polymer.

20 Claims, 6 Drawing Sheets

TUNABLE OPTICAL FILTER

RELATED APPLICATIONS

This application claims priority from provisional application Ser. No. 60/296,451, filed Jun. 8, 2001, entitled "TUNABLE OPTICAL FILTER," the entire disclosure of which is incorporated herein by reference.

FIELD OF THE INVENTION

The present invention relates to a tunable optical filter, particularly for cheaply and efficiently adding or dropping a channel in a wavelength division multiplexing (WDM) communications systems.

BACKGROUND

WDM is a technique in fiber-optic transmission for using multiple light wavelengths (colors) to send data over the same medium, or to transmit two or more colors of light on one fiber, or to simultaneously transmit several signals in an optical waveguide at differing wavelengths. WDM systems involve a number of channels of different wavelengths being transmitted simultaneously in an optical fiber, thereby permitting the transmission capability of the optical fiber to be upgraded to the multiGbit/s range.

The term "fiber-optic" or "optical fiber" refers to an optical waveguide, typically comprising a core and a cladding, which is capable of carrying information in the form of light. The word "light" refers to electromagnetic radiation of any wavelength including laser and IR. The word light includes the portion of the electromagnetic spectrum that can be handled by a fiber-optic used for the visible spectrum extending from the near ultraviolet region of approximately 0.3 micron, through the visible region and into the mid-infrared region of about 30 microns.

A channel is a communication path. Multiple channels can be multiplexed over a single fiber in certain environments. The term "channel" is also used, in the case of fiber optic-based transmission systems, for an electrical or photonic communications path, between two or more points of termination. A wavelength is the length of one complete wave of an alternating or vibrating phenomenon, generally measured from crest to crest, from trough to trough of successive waves. For an electromagnetic waveform, a wavelength is the distance between two crests of the electromagnetic waveform.

Each channel typically is defined by a laser, or high brightness infrared (IR) light emitting diode (LED) source. A LED is a device used in a transmitter to convert information from electric to optical form. It typically has a large spectral width. A LED could be a semiconductor diode that emits light when forward biased to an optical signal.

A tunable optical device is a device for wavelength selection such as in an add/drop multiplexer (ADM), i.e., to add or drop a particular wavelength from a range of wavelengths, by applying a signal, e.g., an electrical signal, to the filter. An example of a tunable optical device is a tunable optical filter. The term ADM refers to a device that enables data to enter and leave an optical network bit stream without having to demultiplex the stream. Demultiplexing is a process applied to a multiplexed signal, i.e., a combination of several signals through a single communications channel, for recovering signals combined within it and for restoring the distinct individual channels of these signals.

In an optical filter, gratings are used to isolate a narrow band of wavelengths. In particular, grating reflectors are used to add or drop a light signal, i.e., filter a light signal, at a predetermined center wavelength to or from a fiber optic transmission system without disturbing other signals at other wavelengths. An optical tunable filter includes precision optical filters that can be tailored specifically for each wavelength of a light signal comprising a number of wavelengths.

A tunable optical filter produces a change in a bulk index of the filter material of the filter, i.e., the filter material, with a change of the signal applied across the filter, and hence of the wavelength of light transmitted through or diffracted from the filter is changed. For example, a hologram is recorded that diffracts light at a certain wavelength with no voltage applied and by changing the voltage across the filter, the refractive index of the filter material is changed. Hence, changing the voltage across the filter changes the wavelength that is diffracted.

A hologram is a pattern, also known as a grating, which is formed when two laser beams interfere with each other in a light-sensitive material (LSM) whose optical properties are altered by the intersecting beams. Electroholographic approaches have been studied and are being developed for making optical tunable filters. The prior art approaches use expensive photorefractive crystals and large voltages to change the bulk index of the filter material and hence the wavelength of light. The disadvantage of such an approach is that the crystals are expensive, suspect to optical and electrical damage, require large voltages and even then do not have a large bulk index change, which therefore limits the tuning range of the filter. In addition, these material support holographic gratings that are weaker (smaller index perturbation) than what can be achieved in polymer based materials.

Other prior art approaches use temperature and strain in material or mechanically stretch the filter material to alter the dimensions of the gratings to get tunable filters. Strain can change the optical quality of the filter materials, but limits the size, thickness, and mechanical properties of the filter material (i.e., to fibers). Using the temperature effect for controlling a tunable filter has many disadvantages. First, temperature is a very poor control signal because its response time is very slow. Second, a change in the environment temperature affects the tuning of the filter. Third, temperature is hard to accurately control for a small change in temperature. Because of the correction needed for variations in the environmental temperature, most of the temperature-based systems need a sensitive servo feedback path.

Therefore, there exists a need for an inexpensive tunable optical filter having a wide tuning range that can be easily and accurately controlled. The filter of this invention can be made inexpensively and has a wide spectral tuning range.

SUMMARY OF THE INVENTION

One embodiment of this invention is a tunable optical device comprising one or more filters, wherein at least one filter comprises (a) one or more elastimers and (b) one or more gratings. The grating could be within the filter, which could have a shape selected from the group consisting of a film, a cube, a waveguide, a fiber and a combination thereof. In one embodiment, the filter is a film having a thickness from 5 micron to 5 millimeters with a tuning range between 1 to 700 nm, preferably 1.3 to 1.6 nm. The grating has periods between 0.1 micron and 500 micron and, in some instances, at least one grating has a slant angle to a surface of at least one filter of at least 5 degrees. In another embodiment, two or more filters could be stacked together, each filter being independently controlled.

The elastimer could be an electroactive polymer and/or an electrostrictive polymer and has a change in thickness of at least about 1 percent by the application of 1 volt across a 1 mm thick film of the elastimer. In other embodiments, the change in thickness could be within the range of about X percent to about Y percent, wherein X is selected from the group consisting of 1, 2, 5, 10, 15, 25, 50 and 100, and wherein Y is selected from the group consisting of 25, 50, 100, 200, 400, 600, 800 and 1,000.

The elastimer could be a polar polymer and/or a non polar polymer. The polar polymer and/or the non polar polymer could comprise a moiety selected from the group consisting of poly(vinylidene fluoride), poly (methyl methacryayte), an odd numbered nylon, a polyurethane, an acrylate polymer, a ferroelectric polymers, and a combination thereof.

The filter could have an isotropic expansion in a thickness direction and could also have an isotropic expansion in a direction transverse to the thickness direction of the filter.

In one embodiment, the filter could further comprise one or more photoactive materials, which could be is a monomer and/or a sensitizer. The monomer is selected from the group consisting of an acrylate, a methacrylate, an acrylamide, a methacrylamide, styrene, a substituted styrene, a vinyl naphthalene, a substituted vinyl naphthalene, a vinyl derivative, a vinyl ether, a maleate, a thiol, an olefin, an alkenyl ether, an allene ether, a ketene acetal, an epoxy and a combination thereof. The sensitizer is selected from the group consisting of bis($\eta$-5-2,4-cyclopentadien-1-yl)bis[2,6-difluoro -3-(1H-pyrrol-1-yl)phenyl]titanium, 5,7,diiodo-3-butoxy-6-fluorone, eosin, rose bengal, erythrosine, methylene blue, n-methyl diethanol amine, a sulfonium salt or an iodonium salt, ($\eta_5$-2,4-cyclopentadien-1-yl) ($\eta_6$-isopropylbenzene)-iron(II) hexafluorophosphate, and a combination thereof.

Another embodiment is a method for manufacturing a tunable optical device, comprising forming a filter material comprising one or more elastimers and one or more photoactive materials, and forming one or more gratings in the filter material. The step of forming a filter material could comprise mixing at least one elastimer and at least one photoactive material to form a mixture and molding the mixture to form the filter material comprising the at least one elastimer as a matrix phase and the at least one photoactive material as a dispersed phase. The step of forming a filter material could comprise mixing a precursor for at least one elastimer and at least one photoactive material to form a mixture, and curing the mixture to form the at least one elastimer.

The grating could be formed by photoinitiated polymerization of at least one photoactive material dispersed inside at least one elastimer. An index profile could be recorded on the filter with a mask.

Yet another embodiment is a method of adding or dropping one or more channels in a wavelength division multiplexing communication system, comprising illuminating multiple channels on one or more filters, expanding or contracting the one or more filters and adding or dropping one or more channels to or from the multiple channels, wherein at least one filter comprises (a) one or more elastimers and (b) one or more gratings.

In a preferred embodiment, the step of expanding or contracting the one or more filters is done without relying on temperature or strain as a control signal for expanding or contracting the filter. The filter could operate in a reflection mode, a transmission mode or a combination thereof. In addition, the grating could unslanted or slanted to a surface of the filter.

The channel that is added or dropped comprises light. In a preferred embodiment, two or more channels are added or dropped simultaneously or independently.

In yet other embodiments of this invention, the filter could provide tunable attenuation of at least one channel and/or the filters are stacked and provide channel by channel attenuation of the multiple channels.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

The present invention will be better understood by reference to the Detailed Description of the Invention when taken together with the attached drawings.

DETAILED DESCRIPTION OF THE INVENTION

The invention relates to a tunable optical device comprising a filter comprising (a) an elastimer and (b) a grating. An elastimer is a polymer that expands and contracts with a change in a voltage applied across the polymer or when a certain wavelength of light is diffracted from or transmitted through the polymer. See *Red Herring* Mar. 22, 2001, and *Nature* 408, 178–181 (2000), which are incorporated herein by reference. An elastimer comprises an electroactive polymer, or more particularly an electrostrictive polymer.

The elastimer can have a 400% dimensional change volumetric change and are controlled by voltage, thereby providing a wide tuning. By putting a photoactive material, which could be a sensitizer, which is a molecule or molecules that absorb light and can start a polymerization, and/or a monomer or an oligomer, i.e., a molecule that can be polymerized, into an elastimer matrix, i.e., the background material that supports but does not necessarily participate in the photopolymerization, comprising the elastimer. Permanent refractive index gratings, i.e., index perturbations that can be long lasting and persist even at elevated temperatures i.e., 60–90° C., can be recorded in a polymer film that formed the filter material. See U.S. Pat. No. 5,871,87, incorporated herein by reference. The recording of the permanent gratings is caused by photoinitated polymerization, i.e., polymerization that is initiated and controlled by light, inside the elastimer matrix. Then, due to the ability of the elastimer matrix to expand and contract, the grating or gratings period (if the structure is periodic) or dimensions, which controls the wavelength diffracted, can be tuned and a grating(s) slang angle, i.e., the angle that the index structure makes to the surface normal, which controls the angle of the diffracted/transmission beam, can be changed.

In one embodiment, the filter material used for making the tunable optical filter comprises an elastimer preferable an electrostrictive, which can be easily processed, a monomer and a sensitizer, the monomer and sensitizer allow holograms (gratings) to be recorded, wherein the dimensional change of the filter material is done without relying on temperature or strain as a control signal. The control signal is preferable electrical voltage but could also be light.

The elastimer includes a polar polymer and/or a non polar polymer comprising poly(vinylidene fluoride), poly(methyl methacryayte), various odd numbered nylons such as Nylon 11 or Nylon 7, polyurethanes, acrylates and ferroelectric polymers.

The photoactive material could be any monomer or monomers capable of undergoing photoinitiated polymerization, and which, in combination with a matrix materials, meets the polymerization reaction and compatibility requirements of the invention. Suitable photoactive materials include photoactive monomers that polymerize by a free-radical reaction, e.g., molecules containing ethylenic unsaturation such as acrylates, methacrylates, acrylamides, methacrylamides, styrene, substituted styrenes, vinyl naphthalene, substituted vinyl naphthalenes, and other vinyl derivatives. Free-radical copolymerizable pair systems such as vinyl ether mixed with maleate and thiol mixed with olefin are also suitable. It is also possible to use cationically polymerizable systems such as vinyl ethers, alkenyl ethers, allene ethers, ketene acetals, and epoxies. It is also possible for a single photoactive material molecule to contain more than one monomer functional group.

The preferred acrylate monomers are monofunctional. These include 2,4,6-tribromophenylacrylate, pentabromoacrylate, isobornylacrylate, tetrahydrofurfurylacrylate, 1-vinyl-2-pyrrolidinone, asymmetric bis thionapthyl acrylate, 2-phenoxyethylacrylate, and the like.

In addition to the photoactive monomer, the optical article typically contains a photoinitiator (the photoinitiator and photoactive monomer being subsets of the photoactive material). The photoinitiator, upon exposure to relatively low levels of the recording light, chemically initiates the polymerization of the monomer, avoiding the need for direct light-induced polymerization of the monomer. The photoinitiator generally should offer a source of species that initiate polymerization of a particular photoactive material. Typically, 0.1 to 20 wt. % photoinitiator, based on the weight of the photoimageable system, provides desirable results.

A variety of photoinitiators known to those skilled in the art and available commercially are suitable for use in the invention. It is advantageous to use a photoinitiator that is sensitive to light in the visible part of the spectrum, particularly at wavelengths available from conventional laser sources, e.g., the blue and green lines of Ar+ (458, 488, 514 nm) and He—Cd lasers (442 nm), the green line of frequency doubled YAG lasers (532 nm), and the red lines of He—Ne (633 nm) and Kr+ lasers (647 and 676 nm). One advantageous free radical photoinitiator is bis($\eta$-5-2,4-cyclopentadien-1-yl)bis[2,6-difluoro-3-(1H-pyrrol-1-yl) phenyl]titanium, available commercially from Ciba as CGI-784. Another visible free-radical photoinitiator (which requires a co-initiator) is 5,7,diiodo-3-butoxy-6-fluorone, commercially available from Spectra Group Limited as H—Nu 470. Free-radical photoinitiators of dye-hydrogen donor systems are also possible. Examples of suitable dyes include eosin, rose bengal, erythrosine, and methylene blue, and suitable hydrogen donors include tertiary amines such as n-methyl diethanol amine. In the case of cationically polymerizable monomers, a cationic photoinitiator is used, such as a sulfonium salt or an iodonium salt. These cationic photoinitiator salts absorb predominantly in the UV portion of the spectrum, and are therefore typically sensitized with a dye to allow use of the visible portion of the spectrum. An example of an alternative visible cationic photoinitiator is ($\eta_5$-2,4-cyclopentadien-1-yl) ($\eta_6$-isopropylbenzene)-iron (II) hexafluorophosphate, available commercial from Ciba as Irgacure 261. It is also conceivable to use other additives in the photoimageable system, e.g., inert diffusing agents having relatively high or low refractive indices.

Preferably, the photoinitiators are selected according to their sensitivity to the light sources. For example, Irgacure 369, Irgacure 819, and Irgacure 907 are suitable for commercial blue laser systems. CGI-784 is suitable for green laser systems, and CB-650 is suitable for red laser systems. Irgacure and CGI are available from Ciba, CB-650 from Spectra Group.

In one embodiment of the invention, the filter material is formed by steps including mixing the elastimer and the photoactive material and molding the mixture to form the filter material comprising the elastimer as the matrix phase and the photoactive material as the dispersed phase.

In another embodiment, the filter material is formed by steps including mixing a precursor for the elastimer and the photoactive material, and curing the mixture to form the elastimer matrix in situ. The precursor and photoactive material are selected such that (a) the reaction by which the precursor is polymerized during the cure is independent from the reaction by which the photoactive material will be polymerized during writing of a pattern, gratings or index profile for such things as waveguide structures, and (b) the elastimer and the polymer resulting from polymerization of the photoactive material (the photopolymer) are compatible with each other. The elastimer is considered to be formed when the photorecording material, i.e., the elastimer matrix material plus the photoactive material, photoinitiator, and/or other additives, exhibits an elastic modulus of at least about $10^5$ Pa, generally about $10^5$ Pa to about $10^9$ Pa, advantageously about $10^6$ Pa to about $10^8$ Pa.

The filters can be formed in the shape of thin films, cubes, waveguides, plastic fibers, thick films that are self supporting or films that are sandwiched between glass or plastic substrates that provide the need mechanical support.

Typical film thickness can range from 5 microns to 5 millimeters. The gratings or index perturbations can have scales or periods between 0.1 micron and 500 microns. By changing the filter thickness either isometrically or uniaxially the center wavelength of the filter can be tuned. For visible application the preferred tuning range is between 400 to 700 nm and for WDM applications the tuning range is between 1.3 to 1.4 nm or 1.4 to 1.6 nm.

The gratings or index structures are formed by the photo-induced polymerization. The sensitizers absorb light and cause the local polymerization of the monomers. The monomers then diffuse to try to reestablish equilibrium and are also polymerized in the light regions. The monomers are chosen to have a different refractive index than the matrix and therefore the composition in the light regions where the monomers have polymerized has a different (either higher or lower) index than the rest of the matrix material.

Figure 1:
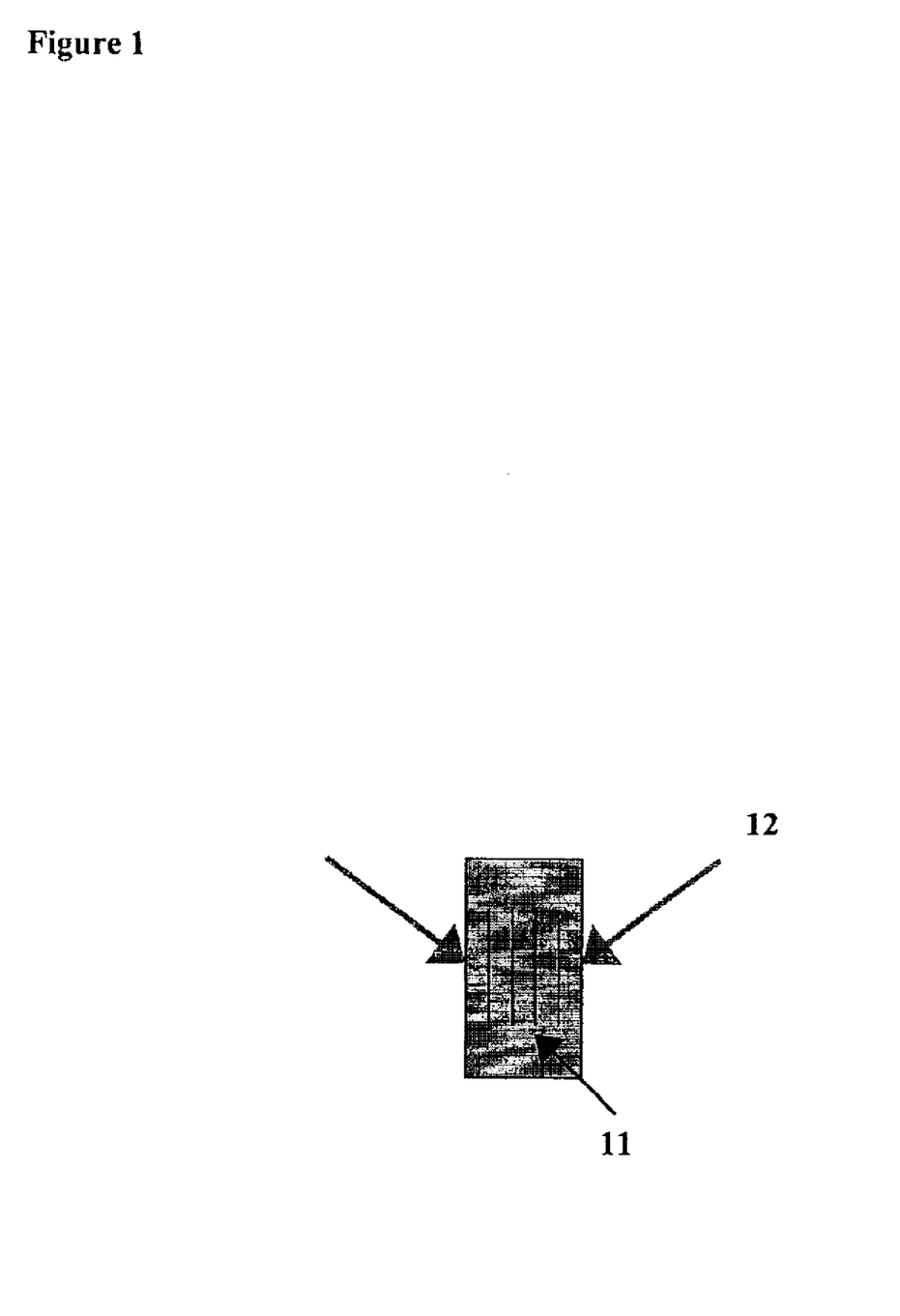
FIG. 1—Formation of a simple grating based feature by recording the grating holographically, showing grating (11) in a polymer using diffusion of monomers resulting in permanent grating and recording (12) a halogram using visible light.

FIG. 1 shows two plane waves interfering in the material. The plane waves are coherent and they set up an interference pattern (light and dark regions) through the material. The light regions start the polymerization process that results in the index perturbation that is similar to the light's interference pattern. The resulting index perturbation is represented by the lines in the material. A tunable filter is made by making a mixture that has the sensitizer and monomers inside the electrostrictive material that forms the matrix. This filter material is then sandwiched between two ITO coated plates so that a voltage can be applied across the filter material. This voltage allow for the thickness of the film to be changed. For most material the thickness (dimensional change) in the geometry and structure described above will resulting in a uniaxially change in thickness. This thickness change then changes the spacing of the slant angle of the grating recorded, which changes the center wavelength of the filter. In fact the most sensitive measurement of the physical change in the index structure is the resulting change in the diffracted behavior of the grating or structure.

In addition to inducing the index profile by recording with multiple beams or multiple exposures, the index can also be record by illumination of a mask. The mask is usually in contact with the filter but it can also be imaged. The mask can be either an amplitude or phase mask as is well known in the art.

After recording a grating in the filter material, the wavelength that is diffracted by the grating is selected by changing the period of the grating using the elastimer properties of the filter material, which allows for the expansion or contraction of the filter material. The optical tunable device of this invention is capable of being used in a diffraction mode, a transmission mode or a combination thereof. In the diffraction mode a light is diffracted (also referred to as "reflected") from the grating while in the transmission mode a light is transmitted through the grating. While the reflection hologram mode has better wavelength selectivity properties (small bandwidth for given thickness) the transmission mode could be more suitable for beam steering applications such as beam steering for changing the angle of beams, modulators, variable attenuation devices as the beam is variably misaligned to cause attenuation. The gratings can be unslanted (perpendicular or parallel to the sides of the filter) or slanted. Slanted grating are more sensitive to uniaxial dimensional change and therefore have a greater tuning range or ability to shift the filters center wavelength. In addition with uniaxial dimensional changes the slant angle changes and allow for a change in the diffracted beams direction which enable beam steering.

The filter of this invention is capable of recording a grating and diffracting/transmitting from the grating with a visible laser, an IR light, e.g., those having 1.3 $\mu$m or 1.5 $\mu$m which are typically used for communications applications, or other parts of the electromagnetic spectrum. The response time (time to change the filters center angle over the entire tuning range) of the filter is in the order of microseconds, which is sufficient for current and near future needs of the optical networks.

Figure 2:
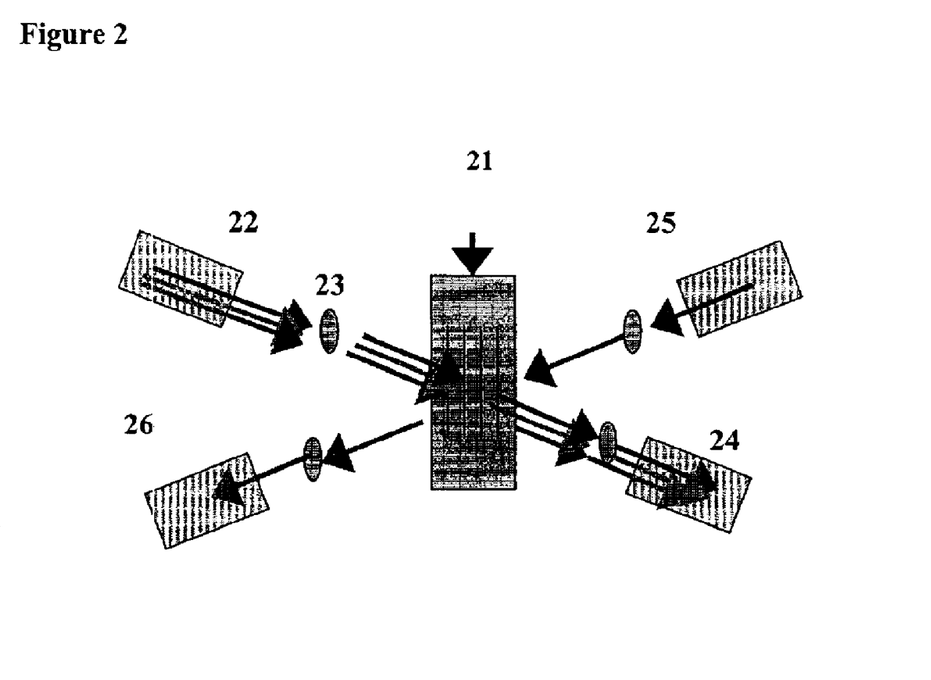
FIG. 2—Use of a simple grating based filter in an electroactive matrix for implement a tunable add drop filter. Multiple channels (wavelengths) are input and one is dropped by reflection from the filter. The same wavelength can be used to add other information channel from the opposite side of the filter. The figure shows control signal (voltage, light, heat (21)), fiber in (22), lens (23), fiber out (24), added channel (25), dropped channel (26), wherein the reflected color is selected by control signal.

FIG. 2 shows a schematic of an optical filter or both optical add/drop by an embodiment of this invention. In FIG. 2, for simplicity, a single grating has been recording the filter material as was shown in FIG. 1. The incoming signal beam has many wavelength in it and one of those wavelengths corresponds to the filters central frequency and is therefore reflected (dropped). Which wavelength (channel) is dropped (reflected by the filter) can be changed by change the voltage on the filter if the material is electrostrictive. On the other side of the filter, a beam at the filters center wavelength and at the same angle as used to record the hologram can be added since its reflection can be made to co-propagate the rest of the signal beams.

In another embodiment, the grating could be slanted in the filter (not parallel or perpendicular to the surface). Such a grating could result in greater expansion and contract in the thickness direction of the filter than that using a non-slanted grating. This could significantly change the angle through which a beam transmitted through the filter in the transmission mode. This effect could be advantageously used to allow the optical tuning device of this invention to be a beam steering device—a device the can change a beam direction of propagation.

In yet another embodiment, multiple gratings can be recorded so that multiple wavelengths can be dropped simultaneously or added simultaneously. By recording multiple gratings or filters, multiple channels (wavelengths) can be dropped and/or added. In addition, filters can be stacked together to drop off different wavelengths into different fibers. By stacking multiple complete filters together multiple channels can be dropped independently with different voltage controls for each filter in the stack. This can be used to independently drop or add N channels where N is the number of filter stacked together. In addition, By slightly miss tuning the filter a filter can attenuate a channel. By stacking the filters together a whole group of channels can be dynamically attenuated to do channel equalization. (need claim on this). Additional embodiments of this invention are described below. For example, the spectral nulls in a filter's response could be tuned by compressing the filter to eliminate any desired wavelength. This is extremely convenient for the drop function in an add/drop optical filter. Similarly, tuning the filter bandwidth away from or onto a desired wavelength range can be used to add/drop a large range of wavelengths at once. The term filter "bandwidth" means the information carrying capacity of the filter and it is the difference between the highest and lowest wavelengths of a band of wavelengths that can be passed by the filter without undue distortion.

Many gratings can be superimposed in the same hologram, thereby allowing more complex relationships between diffracted wavelengths to be established. For example, many different wavelengths could be combined to propagate together (N:1), or the inverse relationship can be used to break one beam containing N wavelengths into N separate beams (1:N).

Extremely narrow optical filters (bandwidths on the order of 0.1 nm) would be possible by recording two gratings that are almost perfectly out of phase. The input beam diffracts off of both gratings and the electric field superposition results in an almost perfect cancellation of the diffraction, except in a very narrow band of wavelengths. The application for such narrow filters would predominately be in fiber optical communications, where 10 Gbit/sec (or more) of data may be transmitted in wavelengths from 1.3 μm to 1.5 μm and bandwidths of 0.3 nm. Narrow band filters could be used exclusively to separate out and recombine the different wavelength channels.

More complicated holograms could be formed using non-plane fringe patterns. For example, if the fringes have a parabolic shape, then with the correct fringe spacing the hologram acts as a holographic optical element (HOE) of a parabolic reflector. By compressing the filter, the focal point of the reflector can be tuned over a large enough range of interest. By the same principle, tunable focal length HOE lenses could be made using similar geometries.

The potential applications include an optical add/drop filter and a tunable filter for communications, channel equalization and channel variable attenuation, replacing color wheels (using the diffracted light as illumination of the spatial light modulator) in display applications, laser shutter (on/off and variable attenuation), a tunable mirror for beam steering, wavelength tunable mirror for laser feedback, and tunable holographic lenses.

Examples of wavelength selection by some of the embodiments of a tunable optical device of this invention are provided below.

EXAMPLE 1

Figure 3:
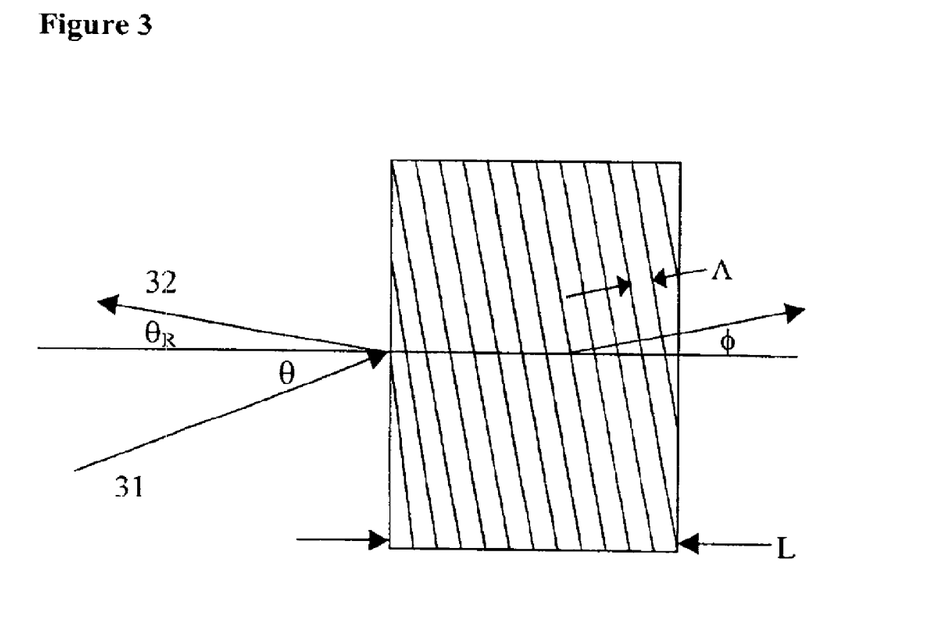
FIG. 3—diagram of the basic grating parameters described in the text. Shown are the gratings period, slang angle, as well as the lights input (31) and reflected angles (32).

In one embodiment, a hologram is composed of gratings as shown in FIG. 3 in which the fringe planes are oriented nominally in parallel with the film surface. An optical beam impinges on the hologram at an angle θ from the surface normal. The grating diffracts the beam at an angle $\theta_R$. The grating is similarly defined by two parameters: the grating period Λ, and the fringe plane orientation angle φ.

For thick holograms the percentage of light diffracted at angle $\theta_R$ will be almost zero unless θ and φ satisfy the Bragg condition: $\cos(\phi-\theta)=\lambda/2\Lambda$, where λ is the wavelength of the input beam. Small changes in the wavelength of the input beam will reduce the amount of light diffracted into the diffracted beam i.e., the reflected beam of FIG. 3. The hologram therefore acts as an optical filter. The range of wavelengths that will diffract with appreciable efficiency defines the bandwidth of the optical filter. The bandwidth is inversely proportional to the thickness of the hologram as shown in FIG. 4.

Figure 4:
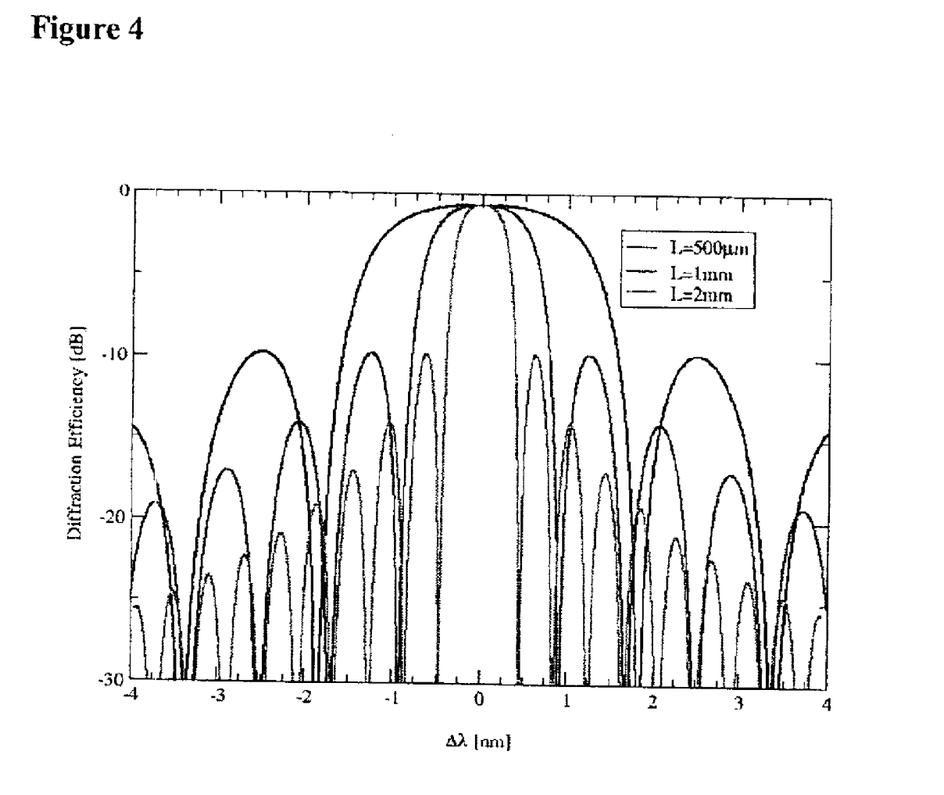
FIG. 4—Plot of bandwidth of a filter (d1) versus diffraction efficiency for three different filter thicknesses. Notice that the passband of the filter becomes narrower with increasing thickness due to the well-known Bragg effect.

FIG. 4 shows the diffraction efficiency as a function of wavelength for three different hologram thickness (L). L is the thickness of the hologram, which is probably also the thickness of the film. The horizontal axis is the change in wavelength (Δλ) from the center wavelength ($\lambda_c$) of 1.5 μm. FIG. 4 shows that a 1 mm thick hologram will have a bandwidth of approximately 2 nm around a center wavelength of $\lambda_c$=1.5 μm while a 2 mm hologram will have a bandwidth of around 1 nm. These bandwidths and wavelengths are of strong relevance to optical fiber communication technologies, especially dense-wavelength-division-multiplexing (DWDM) techniques. FIG. 4 illustrates that a thick hologram would be preferred for a narrow bandwidth optical filter.

EXAMPLE 2

Figure 5:
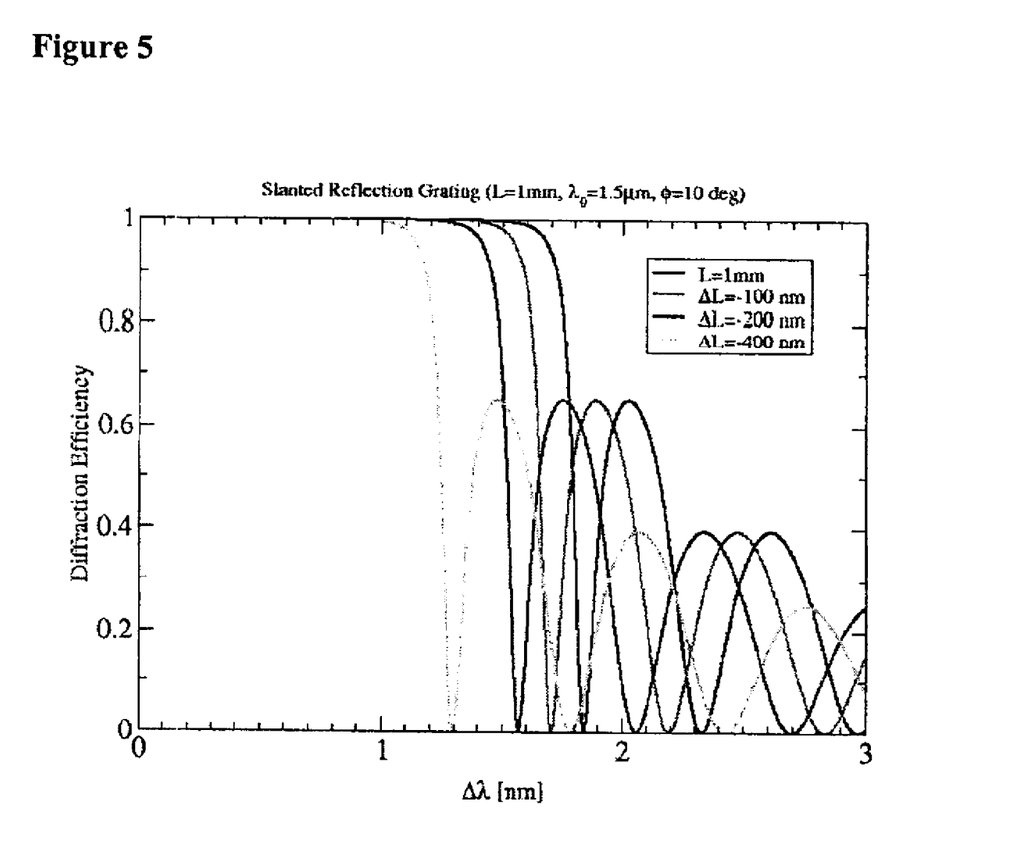
FIG. 5—Plot of change in the center frequency of a filter versus diffraction efficiency against 4 different changes in thickness. Dimensional change is assumed to be primarily in the thickness direction. The center frequency is shifted with increasing dimensional change.

This embodiment illustrates the effect of compressing the holographic media, i.e., the filter, containing the hologram. By compressing the holographic media, both the fringe period (Λ) and the fringe orientation (φ) are modified. The dominant effect of the distorted fringes is the change in the center wavelength of the optical filter. FIG. 5 shows the diffraction efficiency versus wavelength for a 1 mm thick hologram under four levels of compression: no compression, 0.1 μm, 0.2 μm, and 0.4 μm. FIG. 5 demonstrates that the center wavelength of the filter can be changed by compression/expansion of the hologram, i.e., changing the voltage on the electroactive or electrostrictive material. In particular, FIG. 5 shows that a change in thickness of about 0.1 μm shifts the bandwidth edge of the filter by 0.1 nm. In DWDM communication channels, the spacing between channels will be on the order of 0.1 nm to 0.7 nm, which would require a tunable filter having 1 mm thick hologram to be able to compress in the range from 0.1 to 0.7 μm. This range is well within the tunable range of the holographic gratings of this invention.

Figure 6:
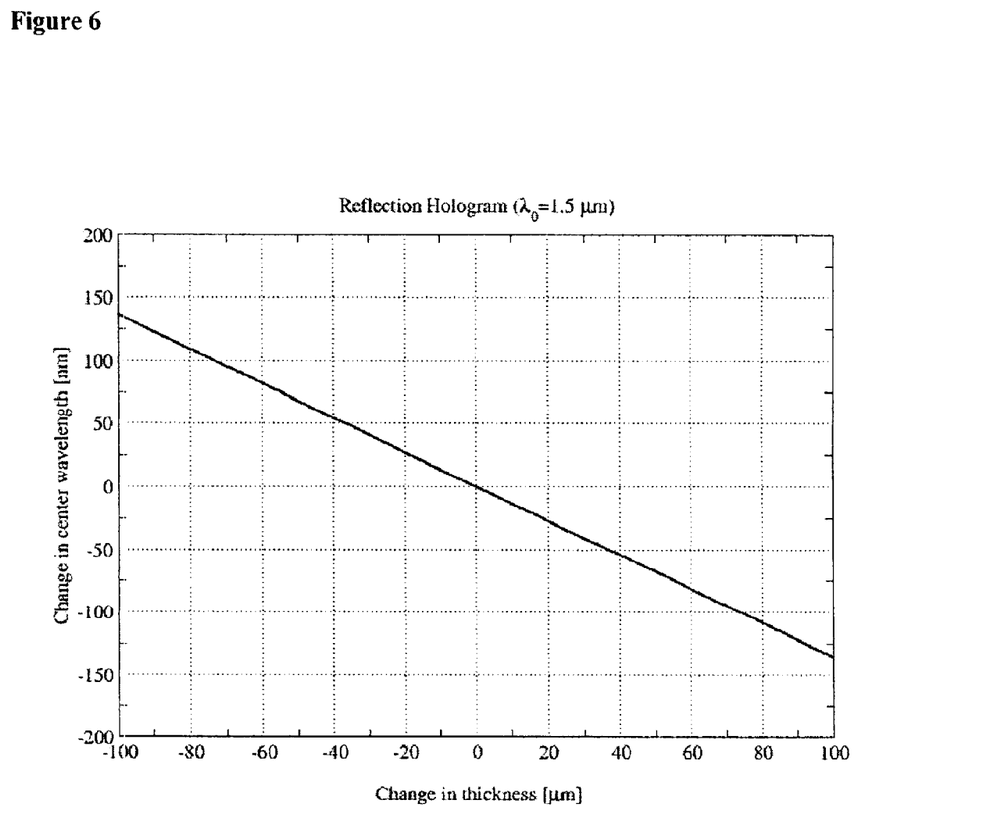
FIG. 6—Plot of change in thickness of a filter in microns versus change in the center frequency of the filter.

For compression/expansion of the hologram on the order of 100 μm, the change in the optical filter center wavelength will be linearly proportional to the change in thickness (ΔL) as shown in FIG. 6, which shows the relation when θ=30 degrees and $\theta_R$=10 degrees.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire invention of the patents and publications referred in this application are hereby incorporated herein by reference.

What is claimed is:

1. A tunable optical device comprising one or more filters, wherein at least one filter comprises (a) one or more elastimers and (b) one or more gratings, wherein at least one elastimer has a change in thickness of at least about 1 percent by the application of 1 volt across a 1 mm thick film of the elastimer.

2. The tunable optical device of claim 1, wherein at least one grating is within the filter.

3. The tunable optical device of claim 1, wherein at least one filter is in a shape selected from the group consisting of a film, a cube, a waveguide, a fiber and a combination thereof.

4. The tunable optical device of claim 1, wherein two or more filters are stacked together.

5. The tunable optical device of claim 1, wherein at least one elastimer is an electroactive polymer and/or an electrostrictive polymer.

6. The tunable optical device of claim 1, wherein the change in thickness is within the range of about X percent to about Y percent, wherein X is selected from the group consisting of 1, 2, 5, 10, 15, 25, 50 and 100, and wherein Y is selected from the group consisting of 25, 50, 100, 200, 400, 600, 800 and 1,000.

7. The tunable optical device of claim 1, comprising a stack of filters each independently controlled.

8. The tunable optical device of claim 1, wherein the filter has an isotropic expansion in a thickness direction.

9. The tunable optical device of claim 1, wherein the filter has an isotropic expansion in a direction transverse to the thickness direction of the filter.

10. The tunable optical device of claim 1, wherein at least one elastimer is a polar polymer and/or a non polar polymer.

11. The tunable optical device of claim 10, wherein the polar polymer and/or the non polar polymer comprises a moiety selected from the group consisting of poly (vinylidene fluoride), poly (methyl methacryayte), an odd numbered nylon, a polyurethane, an acrylate polymer, a ferroelectric polymers, and a combination thereof.

12. The tunable optical device of claim 1, wherein the filter further comprises one or more photoactive materials.

13. The tunable optical device of claim 12, wherein at least one photoactive material is a monomer and/or a sensitizer.

14. The tunable optical device of claim 13, wherein the monomer is selected from the group consisting of an acrylate, a methacrylate, an acrylamide, a methacrylamide, styrene, a substituted styrene, a vinyl naphthalene, a substituted vinyl naphthalene, a vinyl derivative, a vinyl ether, a maleate, a thiol, an olefin, an alkenyl ether, an allene ether, a ketene acetal, an epoxy and a combination thereof.

15. The tunable optical device of claim 13, wherein the sensitizer is selected from the group consisting of bis($\eta$-5-2,4-cyclopentadien-1-yl)bis[2,6-difluoro-3-(1H-pyrrol-1-yl) phenyl]titanium, 5,7,diiodo-3-butoxy-6-fluorone, eosin, rose bengal, erythrosine, methylene blue, n-methyl diethanol amine, a sulfonium salt or an iodonium salt, ($\eta_5$-2,4-cyclopentadien-1-yl)($\eta_6$-isopropylbenzene)-iron(II) hexafluorophosphate, and a combination thereof.

16. A method for manufacturing a tunable optical device, comprising:

forming a filter material comprising one or more elastimers and one or more photoactive materials, and forming one or more gratings in the filter material' wherein at least one elastimer has a change in thickness of at least about 1 percent by the application of 1 volt across a 1 mm thick film of the elastimer.

17. The method of claim 16, wherein the forming a filter material comprises:

mixing at least one elastimer and at least one photoactive material to form a mixture and molding the mixture to form the filter material comprising the at least one elastimer as a matrix phase and the at least one photoactive material as a dispersed phase.

18. The method of claim 16, wherein the forming a filter material comprises:

mixing a precursor for at least one elastimer and at least one photoactive material to form a mixture, and curing the mixture to form the at least one elastimer.

19. The method of claim 16, wherein at least one grating is formed by photoinitiated polymerization of at least one photoactive material dispersed inside at least one elastimer.

20. The method of claim 16, wherein an index profile is recorded with a mask.

* * * * *